United States Patent [19]

Walton

[11] 4,236,068
[45] Nov. 25, 1980

[54] PERSONAL IDENTIFICATION AND SIGNALING SYSTEM

[76] Inventor: Charles A. Walton, 19115 Overlook Rd., Los Gatos, Calif. 95030

[21] Appl. No.: 24,964

[22] Filed: Mar. 29, 1979

[51] Int. Cl.² .................. G06K 5/00; G06K 19/06; H04Q 9/02; G01S 9/56
[52] U.S. Cl. .................. 235/380; 235/439; 235/488; 340/152 T; 340/171 A; 343/6.5 R
[58] Field of Search .................. 235/380, 439; 340/152 T, 171 A; 343/6.5 R; 179/2 EC

[56] References Cited

U.S. PATENT DOCUMENTS

| 3,299,424 | 1/1967 | Vinding | 235/439 |
|---|---|---|---|
| 3,438,489 | 4/1969 | Cambornac et al. | 209/576 |
| 3,665,448 | 5/1972 | McGlinchey et al. | 235/439 |
| 3,679,874 | 7/1972 | Fickenscher | 235/454 |
| 3,752,960 | 8/1973 | Walton | 235/439 |
| 3,755,803 | 8/1973 | Cole et al. | 235/439 |
| 3,816,708 | 6/1974 | Walton | 235/439 |
| 3,828,337 | 8/1974 | Lichtblau | 340/152 T |
| 3,832,530 | 8/1974 | Reitboeck et al. | 235/439 |
| 3,906,460 | 9/1975 | Halpern | 235/439 |
| 3,929,277 | 12/1975 | Byrne et al. | 235/376 |
| 4,025,791 | 5/1977 | Lennington et al. | 250/341 |
| 4,047,156 | 9/1977 | Atkins | 340/171 A |

*Primary Examiner*—Daryl W. Cook
*Attorney, Agent, or Firm*—Gerald L. Moore

[57] ABSTRACT

A personal identifier comprising a portable device for generating a signal identifying the user. This identifier may be reprogrammed periodically by the user for protecting against unauthorized use or for sending special information. In addition the identifier can be energized to radiate a uniquely coded high energy signal to indicate the user needs emergency assistance and also includes a loudspeaker for transmitting the signal to a telephone receiver to allow communicating through the telephone system.

26 Claims, 6 Drawing Figures

PERSONAL IDENTIFICATION AND SIGNALING SYSTEM

RELATED U.S. APPLICATION DATA

U.S. application Ser. No. 934,951, filed on Aug. 18, 1978, and entitled: IDENTIFICATION SYSTEM, with Charles A. Walton, inventor.

BACKGROUND OF THE INVENTION

This invention relates to a device similar to that disclosed in the above-identified application Ser. No. 934,951 which discloses an electronic identification and recognition system using a portable, radio-frequency signal generator. This generator is controlled by a single oscillator and emits a plurality of radio frequency signals in a particular predetermined sequence so as to be identifiable from all other signals. In this manner the user can generate his signal to serve such identification purposes as the obtaining of credit, the cashing of checks or admittance to certain restricted areas.

The present invention is an improvement on the previously disclosed identification generating system identified above in providing for a more universal and improved use of the identifier, providing improved security to the user against unauthorized use in allowing for changeable coding, allowing the generation of an emergency signal for indicating that the user needs immediate personal assistance, allowing for transmission of special messages, displaying the device status and data reception, providing communication with the identifier through the telephone system, and providing visual and oral feedback to the user.

SUMMARY OF THE INVENTION

A personal portable identifier for generating a signal which can be distinguished by a receiver from all other signals to allow identification of the user. The identifier generating circuit is programmable by the user to alter the signal in a manner to guard against unauthorized use of the identifier or to send special information, such as Amount of Cash Withdrawn, Authorizations, et cetera. The identifier is also energizable to generate an emergency signal indicating the user needs emergency assistance. For communication through the telephone system with a central unit, the identifier will also emit and receive an audio signal. Identifier activity can also be displayed.

DESCRIPTION OF THE INVENTION

Figure 1:
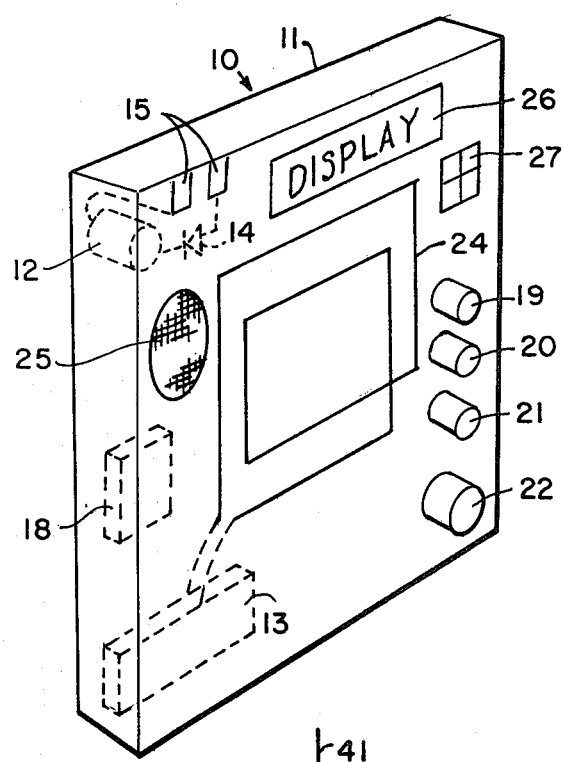
FIG. 1 is a perspective view of the identifier incorporating the invention.

In FIG. 1 is shown a signal generating identifier 10 in which the subject invention is incorporated. This signal generator is housed in a case 11 preferably made of plastic and small enough to be easily carried in a shirt pocket or worn on the wrist. In general there is included in the case an electronic circuit 13, the operation and functioning of which will be explained later. This circuit is powered through electrical connections (not shown) to a battery 12 which preferably is rechargeable.

Figure 2:
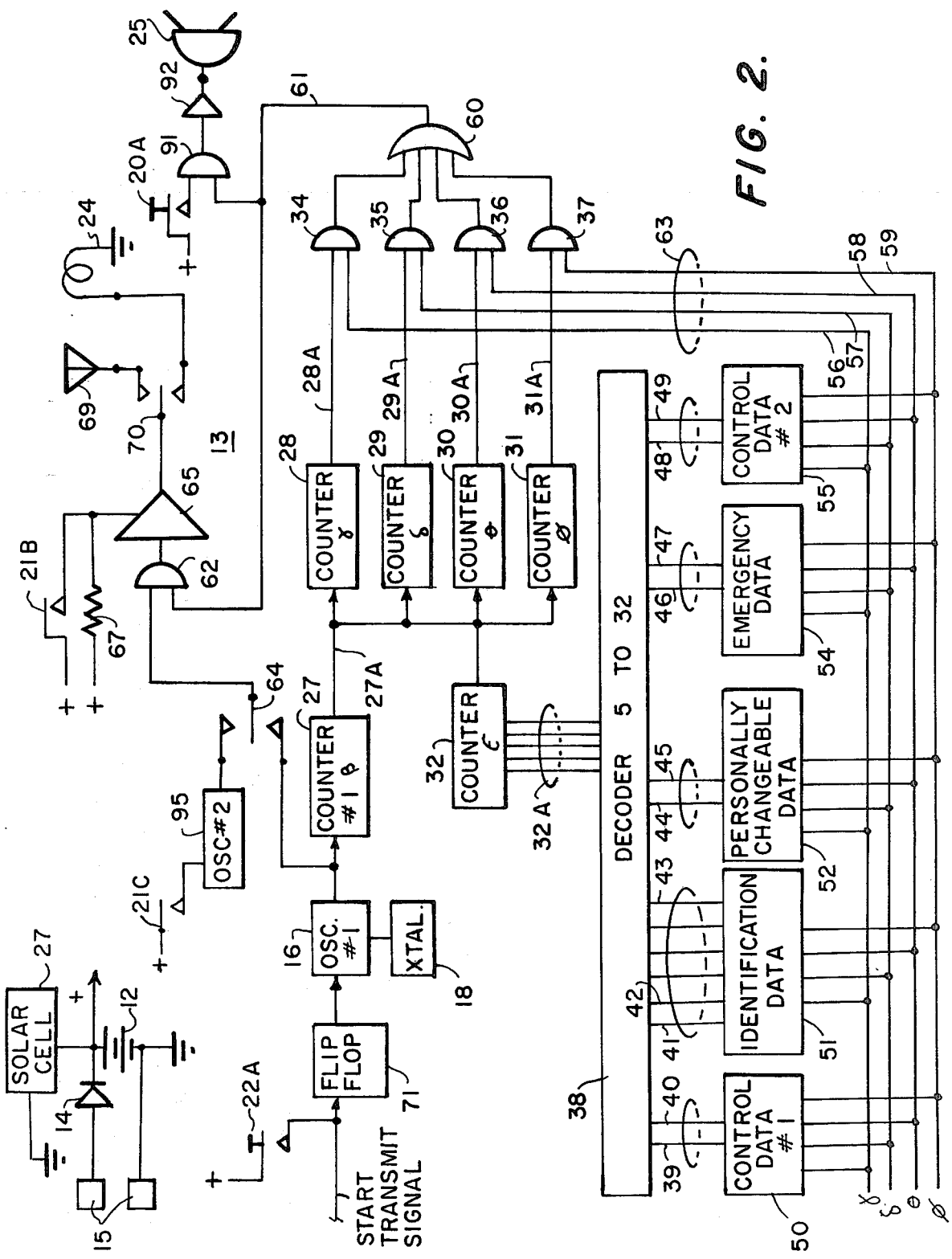
FIG. 2 is a circuit diagram of the circuit for the identifier.

As explained in the before-mentioned copending application, the circuit 13 contains as shown in FIG. 2 a primary oscillator 16 and optional oscillator 95, the various counters 27, 28, 29, 30, 31, 32 and a repetition counter (not shown); the encoding group; the modulation group; the power amplifiers; and the control circuits. The encoding group differs from the copending application primarily in that the coding is controlled and adaptive in a manner to be described. There is a crystal 18 which cooperates with the oscillator circuit 16 to fix the radio frequency. Various switches 19, 20, 21, and 22 are provided which control the functioning of the identifier in the manner described later. In addition a magnetic dipole antenna 24 is connected to the electronic circuit 13 for radiation of the signal generated. A speaker 25 and a display 26 are provided and an optional solar cell 27 is connected to the battery for recharging purposes. Not shown is a microphone providing the optional function of receiving data from the telephone.

Shown in FIG. 2 in block diagram form is one embodiment of the circuit which can be used in the identifier 10. The primary purpose for this circuit is to permit generation of a signal which is distinguishable from all other signals of such signal generators. Shown therein is the battery 12 connected to the diode 14 and the recharging contacts 15 described later. The switch 22, when actuated, energizes flip-flop 71 and thus the oscillator 16 for the generation of a constant frequency signal which is transmitted to a counter 27. Ten megahertz is a suitable example frequency for the signal fed through the counter 27 for the generation of a second signal beta having a frequency that is a submultiple of the original constant frequency signal. This signal is transmitted simultaneously to a plurality of counters 28, 29, 30, 31 and 32 which divide the frequency by different values. The output signals of counters 28, 29, 30 and 31 are lesser frequencies and are transmitted by conductors 28A, 29A, 30A and 31A respectively, to AND gates 34, 35, 36 and 37. One signal is supplied for triggering one input of each AND gate 34, 35, 36 and 37 from the counters 28, 29, 30 and 31. The manner of generation of the other input for each AND gate will be described hereinafter. The function of the output signal of counter 32 is next described.

Preferably counter 32 has the lowest frequency output of all the counters. The most significant bits of counter 32, five bits in this example, are supplied over lines 32A to the decoder 38. This decoder is of standard design and in the example shown, the five most significant bits are received through the five parallel lines making up the conductor 32A. The decoder expands these five parallel lines into a multiplicity of output lines. These lines are numbered 39 through 49. Typically, for a five bit input signal to the decoder 38, there are 32 output lines or signals. As counter 32 advances, the 32 output lines are sequentially energized or "UP" and sequentially stimulate the intelligence containing switch circuits 50, 51, 52, 54 and 55. All 32 output lines are not illustrated but those lines that are illustrated are described as an example of how the circuits function.

Figure 3:
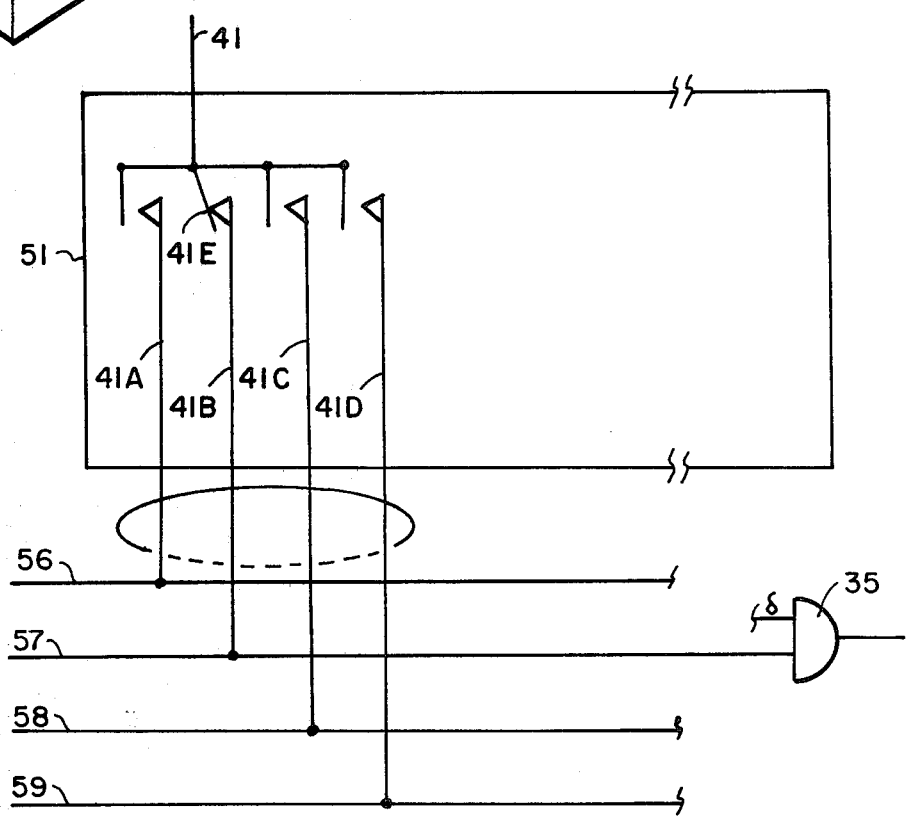
FIG. 3 is a circuit diagram of selected components of the circuit of FIG. 2 and shows the serial bit feature.

The eleven lines that are shown are numbered 39 through 49. Each line is responsible for selecting one of the signal frequencies in the manner described in the copending application. The data capacity of the application has been expanded over that previous circuit so that in each bit position (equivalent to a time position), one of four frequencies (gamma, delta, theta or phi) may be selected, rather than one of two. To illustrate, in FIG. 3, line 41 is shown and within identification data box 51, line 41 may exit on any of four lines 41A, 41B, 41C and 41D (shown as a trunk line), according to the bit of intelligence allocated to that line. In the example of FIG. 3, line 41B is selected.

Line 41B is connected to line 41 by a switch 41E, and lines 41A, 41C and 41D are not connected. In practice, this connection would be achieved by a fusible semiconductor link, or equivalent technology, and in practice a standard read-only memory, or ROM, might be used. This ROM would incorporate part of the decoding function performed by decoder 38. Line 41A is connected to line 57 which is connected to AND gate 35. Thus when line 41 is energized (or UP) in proper sequence, line 57 is UP, AND gate 35 is ON, and the frequency signal of counter 29 is passed through the gate 35 and the rest of the system. Similarly, lines 39 to 49 in turn may select and energize any one of the four lines 56, 57, 58 or 59. It is within boxes 50, 51, 52, 54 and 55 that the intelligence selection is made. Lines 39 to 49 are sequentially energized and at each step of the sequence, one of the four lines 56, 57, 58 or 59 is energized and consequently one of the four frequencies, gamma, delta, theta or phi, is transmitted from the AND gates 34, 35, 36 or 37. The individual parts of switching circuits 50, 51, 52, 54 and 55 are set open or closed for conduction of the signals received in accordance with predetermined programming and in that manner, determine the codes which control transmission through the AND gates 34, 35, 36 and 37.

Thus as the decoder 38 functions responsive to the signal from the counter 32, the switching circuits 50, 51, 52, 54 and 55 transmit the sequence of decoder signals in accordance with a coded switching sequence within each switching circuit. Thus the AND gates 34, 35, 36 and 37 are closed in coded sequence for the transmission of bursts of the signals received through the conductors 28A, 29A, 30A and 31A. As can be seen, both the decoder signals and the counter signals are generated responsive to the single frequency from the stable oscillator 16 thereby eliminating timing or frequency error considerations.

In operation the decoder 38 advances sequentially through the various positions of the output lines such that these output lines 39 through 49 are energized in sequence. The bit rate of the signal transmitted from the decoder is the frequency of the fifth most significant bit signal emitted from the counter 32 which in turn is a division of the signal rendered by the oscillator 18A. Thus each of the counter signals are synchronized by the fact that they derive the respective signals from the basic oscillator signal.

With the triggering of one of the AND gates 34, 35, 36 or 37, a signal is transmitted to the OR gate 60 and from there through the conductor 61 to the AND gate 62. In addition there is supplied to the AND gate 62 the signal from the oscillator 16 through the switch 64 for transmission via the AND gate 62 to the amplifier 65.

Thereafter the signal is supplied to the switch 70 for transmission to the loop antenna 24. An alternative electric dipole antenna 69 is also provided for purposes to be explained later and is selectably connected in the circuit by the switch 70.

Thus the four frequency signals generated by the counters 28, 29, 30 and 31 modulate the radio frequency signal emitted by the antenna 24, in accordance with the programming of the switching circuits 50, 51, 52, 54 and 55. The frequency signals are supplied to one terminal of the AND gates 34, 35, 36 and 37 on a constant basis and the switching circuits, acting through the bus 63, act to open the respective gates in a coded sequence for the transmission of bursts of the frequency signals.

The identification data circuit 51 preferably is programmed at the time of assembly or at the time of first use and serves to generate a signal identifying the particular identifier and therefore the user. When the identifier is acquired, that identification programmed into the circuit 51 is assigned to the user such that all communications therefrom will be correlated with the particular user. Each of the control circuits and the identification circuit serve to energize the conductors of the bus 63 in a predetermined coded sequence for the transmission of the frequency signals through the respective AND gates in a preprogrammed sequence.

The control data circuits 50 and 55 are provided to synchronize the receiving system which is capable of receiving and identifying data signals. Control data circuits 50 and 55 are set permanently to notify the receiving system and inform the receiver that data transmission is being initiated and thereafter that the data transmission is being terminated. Circuits 50 and 55 are described in more detail near the end of the specification.

Communication with the central unit is initiated by actuation of the button 22 or by an interrogation signal as described in the copending patent application. Button 22 closes a switch 22A and sets the flip-flop 71. The flip-flop times the signal generation of the identifier as described in the copending application so that a predetermined recycling of the signal is achieved. Such operation assures that the central communicator sensing the signal receives a sufficient number of cycles to practically eliminate the possibility of erroneously identifying the user.

Figure 4:
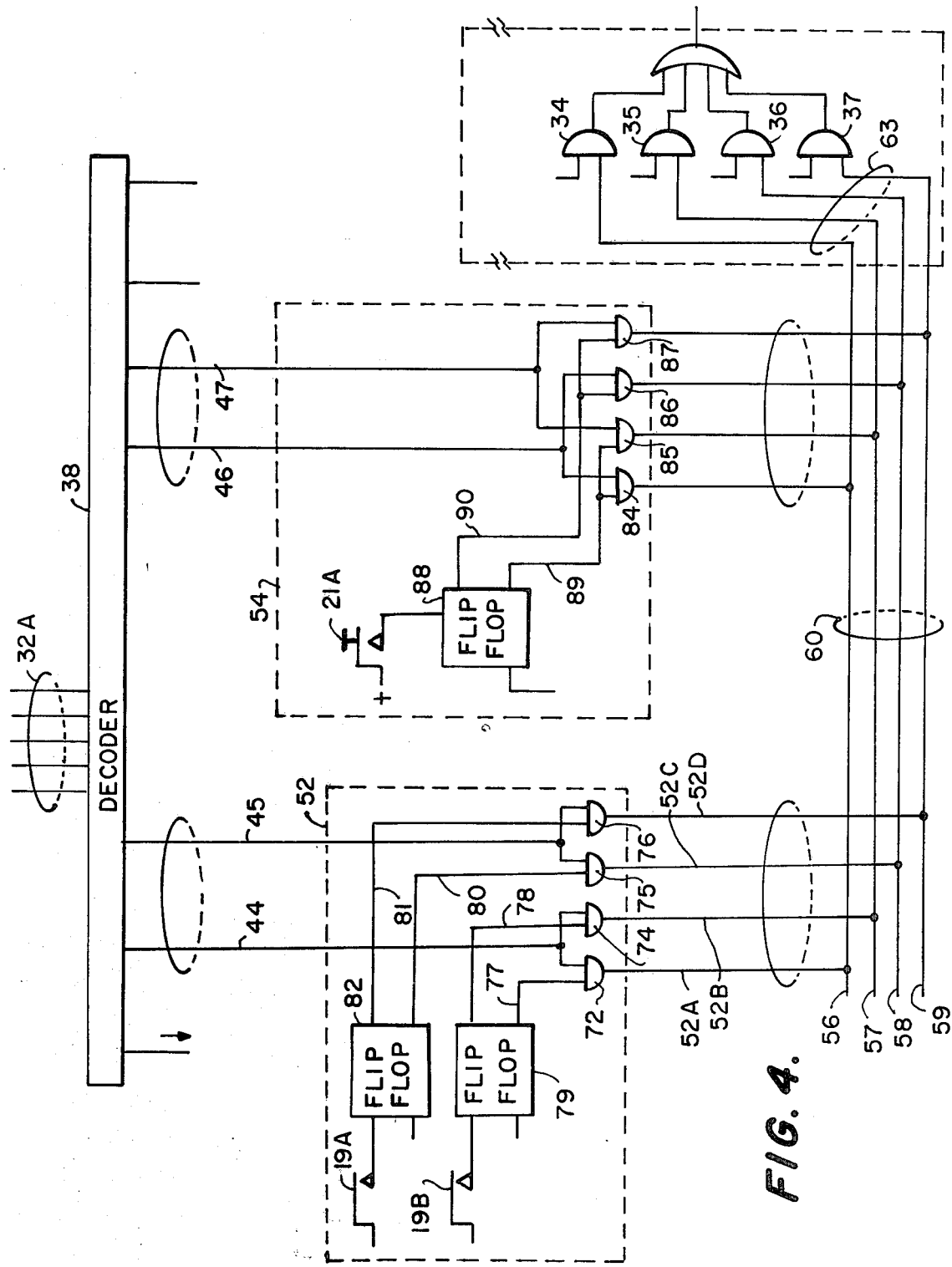
FIG. 4 shows the modifiable portions of identification message.

In accordance with one feature of the invention, the identifier can be personally reprogrammed by the user so as to change the output signal in a manner to reduce the possibility of unauthorized use of the users coded sequence of frequencies. The circuit allowing the reprogramming is shown in FIG. 4. The capability to reprogram substantially prevents unauthorized use of a similar signal without having possession of the identifier as might occur if the identifier signal was prerecorded. If the code was permanent and recorded by an illicit receiver, forgery of the personal code would be possible. However, with periodic changing of the code and the reporting of this change to the central receiving system, such forgery is made difficult if not impossible.

For this purpose the programmable data circuit 52 can be changed by the user with the actuation of the button 19 (FIG. 1). As shown in FIG. 4 the programmable data circuit 52 receives decoder 38 signals via conductors 44 and 45. Additionally the circuit communicates with the bus 63 through the conductors 52A, 52B, 52C and 52D. Transmission of the signals from the conductors 44 and 45 to the bus 60 is regulated by the AND gates 72, 74, 75 and 76. The signal from the conductor 44 is supplied to the AND gates 72 and 74 while the signal from the conductor 45 is supplied to the AND gates 75 and 76. To the other terminal of the AND gates 72 and 74 is supplied a signal through the conductors 77 and 78 from a memory flip-flop 79. Similarly the other terminal of the AND gates 75 and 76 is connected through the conductors 80 and 81 to a memory flip-flop 82. The setting of the flip-flops 82 and 79 is controlled by the switches 19A and 19B which are actuated by the switch 19. The flip-flops can be set and reset by the setting of the switch 19 to modify the code. The setting procedure is analagous to that of setting the time in an electronic wristwatch.

The effect on system performance is as follows. When line 44 is energized (or UP) AND gates 72 and 74 are half selected. If flip-flop 79 is set, line 78 is UP, then AND gate 74 is fully selected and via line 52B, line 57 is UP and AND gate 35 is selected and the output frequency is delta. If, however, flip-flop 79 had not been set (reset), AND gate 72 would then be half selected so that an UP condition on 44 energizes 52A which energizes line 56 and gate 34 to cause transmission of the output frequency gamma. Thus the flip-flop position determines which frequency is to be transmitted in a given code position. Similarly the setting of flip-flop 82 determines which frequency is transmitted when the next bit position, equivalent to line 45, is energized.

Such changes in user programming must be reported to allow the central unit to respond properly and to distinguish between forged signals and legitimate signals. The user may report the change from only certain selected terminals such as can be located in his home or the office, with optional auxiliary procedures. Alternatively the change may be reportable only during certain time periods of the day known only to the user. Other procedures such as alternative switches on the identifier added for additional security, will occur to one skilled in the art. Such switches having multiple settings could be used much like a combination lock requiring that preselected settings be made before a proper transmission to the central receiver can be achieved. A significant feature of flip-flops 79 and 82 is that they are of the extremely low energy drain type, such as are used in certain miniature electronic calculators and wristwatches, so that the stored settings remain for long intervals even though the main power is off.

In accordance with another feature of the invention the identifier can be energized to emit an emergency signal which is communicated to a central communicating unit and thence to any emergency services organization such as a fire or police station. It is anticipated that such an emergency signal could denote that the user is in need of immediate emergency aid such as being involved in an automobile accident or other mishap or possibly in the event of a serious physical malady such as a heart attack.

Such emergency action is initiated by pressing the button 21 to cause one or all of the following changes. The contacts 21B (FIG. 2) of switch 21 are closed by actuation of the button 21 which shorts out the resistor 67 and increases the power input to the amplifier 65. By raising the amplification level of this amplifier, the signal strength is increased as may be necessary because of the emergency situation and the possibility that the user is remote to a central receiver. It is realized that the increase in amplification will deplete the battery faster but such may be warranted under such conditions. It is further realized that the increased signal amplification might violate Federal Communications Commission regulations and special arrangements must be made for such emergency transmissions. The frequency for the emergency signal may be one approved by the FCC for industrial-medical-scientific purposes or one selected especially for emergencies. To minimize the rate of battery depletion the repetition rate of the emergency signal may be reduced to one transmission per second or a similar slow rate.

In order to make the emergency signal situation recognizable to the central receiver station, several bits of the internal data in known bit timing positions, are changed or recoded. In FIG. 4, pole 21A of switch 21 also contacts and the flip-flop 88 is moved from the reset mode to the set mode and the AND gates 84 and 85 are turned off (deenergized) and the AND gates 86 and 87 are turned on. The bit position represented by the decoder output line 46 and that represented by the line 47 in non-emergency conditions cause the transmission of the frequency signals gamma and delta in that order, via lines 56 and 57 and the AND gates 34 and 35. In emergency conditions, however, the lines 46 and 47 will act through AND gates 86 and 87 to energize lines 58 and 59 and as a consequence, the modulation frequencies theta and phi will be transmitted through the gates 36 and 37. The central receiving device has the capability to recognize the differing frequencies and consequently signal the need for appropriate emergency action. Associated with the emergency data is the identification of the individual from the data group 51.

Switch 21 also includes a pole 21C (FIG. 2). This pole will turn on the oscillator 95 and operate the double throw contacts 64, so that a different radio frequency is supplied to the antenna network. This new radio frequency will be one which has been dedicated to emergency service. At the same time that the value of the radio frequency has been changed, the double throw contacts 70 are operated to select the preferred antenna 24 or 69 in a manner chosen to optimize the radio field strength and consequent range of operation.

In accordance with another feature of the invention the identifier can transmit the signal by telephone, as well as through the antenna, by use of the speaker 25. For this purpose there is provided the switch 20 which when actuated, closes the contacts 20A to set one terminal of the AND gate 91. Thereafter any signal supplied through the conductor 61 passes through the AND gate 91 and the amplifier 92 to the loudspeaker 25. With the identifier held adjacent the receiver of a telephone, the audio signal is transmitted by sound through the telephone system. In actual practice the modulation frequencies of the radio signal may be greater than the actual bandwidth of the telephone line so that it might be necessary to insert an additional counter (not shown) between the counter 27 and the conductor 27A, which counter would serve to reduce all frequencies of the output signal to a value within the bandwidth of the telephone line.

As a further extension of the use of the personal identifier system, telephone sets can be equipped with a miniature radio frequency receiving circuit, set to receive identifier frequencies. A signal from the identifier, of either an emergency or a normal frequency, will automatically initiate transmission of appropriate audio codes over the telephone lines. Thus, reporting of emergencies or simply of the location of the user can readily occur throughout much of the country by use of present technology.

Figure 6:
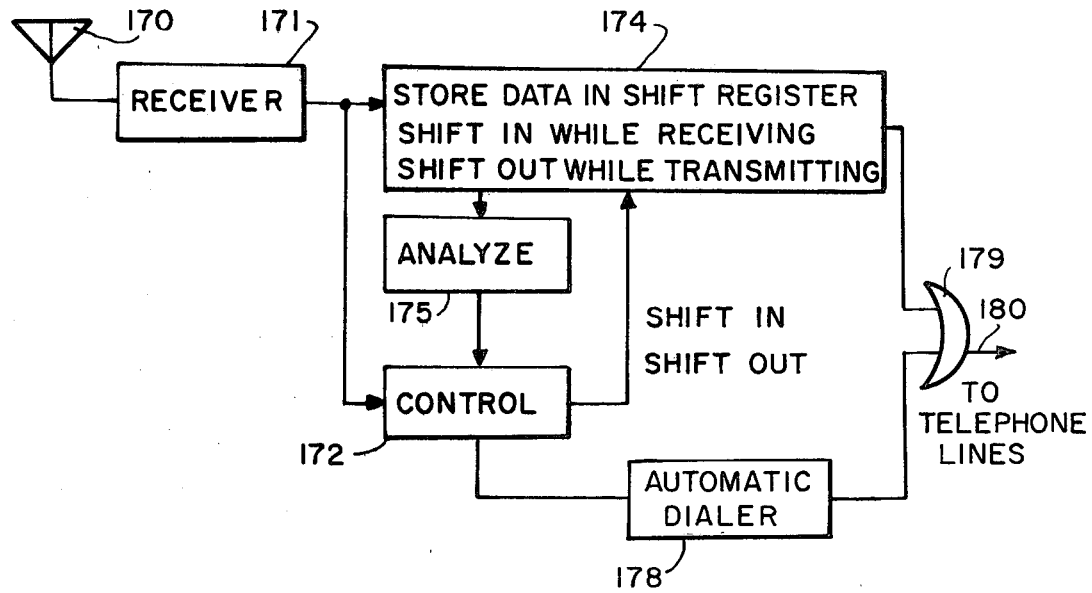
FIG. 6 shows a telephone connection circuit for relaying the identifier signal through the telephone circuits.

FIG. 6 illustrates a telephone relay system. The antenna 170 and receiver 171 receive data from the identifier, and signal the control element 172 and the data is shifted into the shift register 174. The data is analyzed by the analyzer 175 to detect the emergency data, or any special data which requires use of the telephone system. If telephone use is indicated, the control element 172 initiates automatic dialing to police, fire, medical or other services via the automatic dialer 178 and once the connection is established, transmits the stored data from the shift register 174 to the telephone line 180. The OR gate 179 accepts either shift data or dialing signals for transmission through the line 180. Thereafter the data is processed as previously described.

The battery 12 can be recharged through contacts 15 and diode 14. The contacts 15 can either be flat conductors such as those shown, or in the form of a female connector of a suitable type (not shown), so the connection can be made to a power source for recharging the battery. The diode 14 prevents a rapid discharge of the battery if the contacts are shorted as might occur with coins in the pocket holding the identifier.

Figure 5:
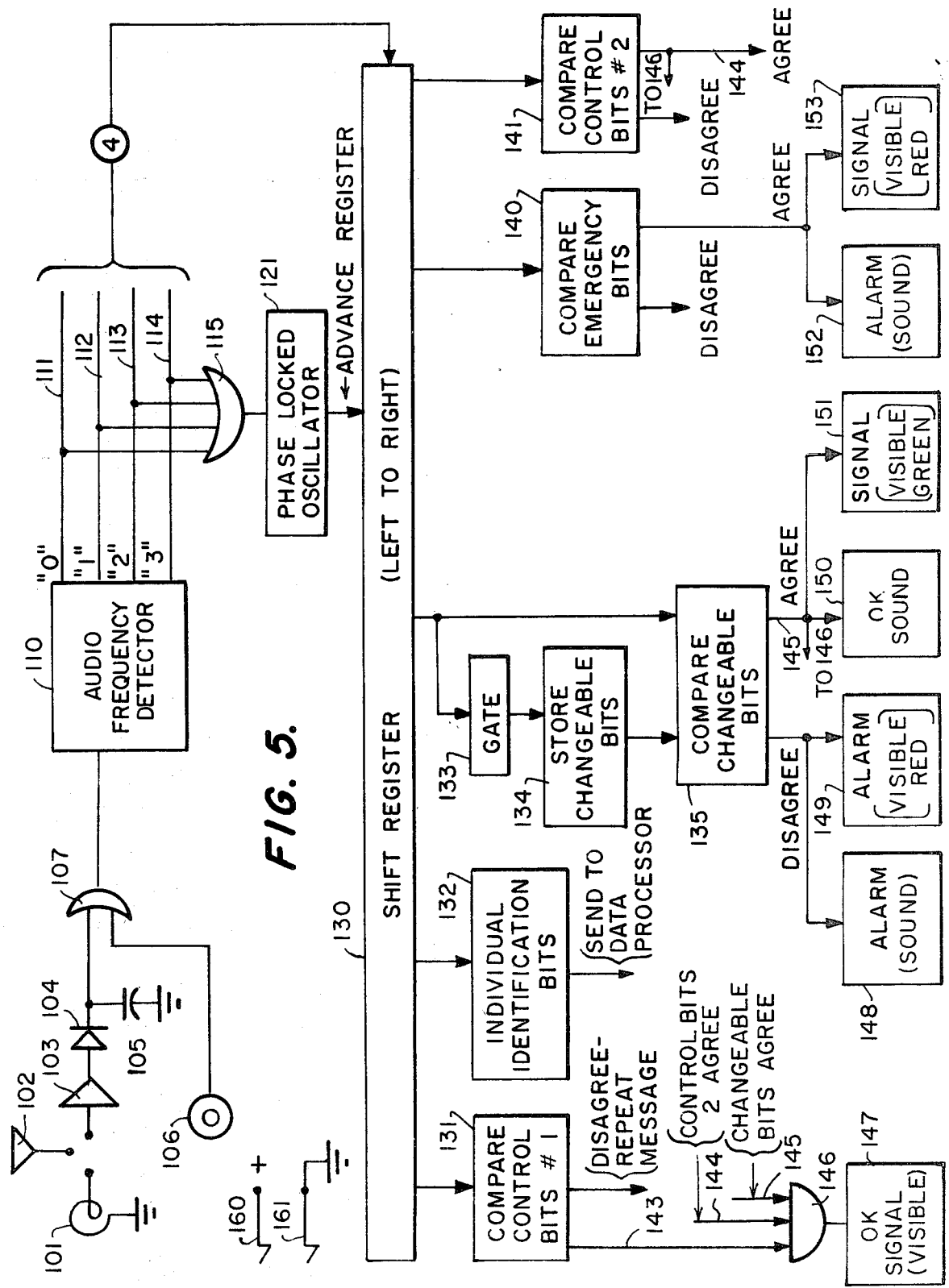
FIG. 5 is a block diagram of a typical receiving station for processing the signal generated by the identifier.

Contacts 160 and 161 in the receiver shown in FIG. 5 provide a recharging voltage to contacts 15.

To provide the identification message with a clearly defined beginning and end, the components 50 and 55 of FIG. 2 contain codes identifying the limits of the signal. The initial bits for a message are generated in the control box 50. These bits preferably are in a series of a certain length and nature, such as alternating gamma and delta frequencies, to allow the receiver to "lock on" to the message. "Lock on" means that the receiver detects that a message has been initiated and causes the receiver internal bit clock to synchronize with the bit rate of the signal being received from the identifier. A phase locked oscillator is typically part of the receiver circuit. Code steps and wires 39 and 40 are illustrated entering this control box; in practice a greater number of steps (and bits) are required to bring about this initial synchronization. At the conclusion of the identification message, control data codes are entered by box 55. A short burst of alternating theta and phi frequencies are one choice to mark the end of the data transmission. Also, to increase the degree of reliability, there can be included at the end of the message a parity bit and codes useful for error detection and error correction, well-known in the art.

In FIG. 5 are shown the pertinent primary elements of one type of receiving system suitable for receiving and responding to the identification system previously described. The data signal is received on a radio frequency loop antenna 101, or an electric dipole antenna 102, or from a microphone 106. If the signal is radio frequency, it is converted to audio/video frequencies by amplifier 103, detector 104 and a capacitor 105. The alternative data signals pass through the OR gate 107 to the audio frequency detector 110. This detector may be a conventional linear filter, or a synchronous detector, or a digital filter. The outputs therefrom are "0," "1," "2" or "3," corresponding to the frequencies gamma, delta, theta or phi, and appear on lines 111, 112, 113 and 114 in accordance with the manner the frequencies appear in the signal received.

All of the frequency signals are sent through the OR gate 115 to a phase locked oscillator 121 which runs at the data bit rate epsilon. The set of four signals on line 116 is transmitted to the shift register 130 and the bits are shifted in by the phase locked oscillator 121. The bits move from right to left in the register at a normal transmission rate and then stop when the first control bit reaches the proper register position. The bit positions in the register now correspond to the bit positions of decoder 38 in the identifier. With the information in the register, it is now ready to be analyzed. In practice, there preferably would be multiple identifier transmissions for reasons of reliability, so the register 130 in that instance would serve as a memory to enable the comparing of several transmissions prior to analysis.

The control bits are first compared in logic units 131 and 141 and if there is proper agreement and a correct validity check, data processing can proceed. Next the emergency bits are compared with the preestablished emergency bits, in logic box 140. If the emergency bits agree or match, an alarm is actuated. Next the personally changeable or modifiable bits are compared in comparator 135 against the correct values stored earlier. If these agree further data processing can proceed. Under certain predetermined and "privileged" conditions, gate 133 is open or ON, to allow the "personally changeable" bits to be set from the identifier. Once set, they remain fixed and stored in 134 until the next privileged change. As explained previously, such changes serve to frustrate forgers by preventing illicit recording and later unauthorized usage of the identification code. Once the message passes the foregoing tests, the individual identification bits appearing at the logic identification 132 may be sent to a data processor (not shown) for appropriate decisions, such as credit approval, or actuation of any device or signal (not shown).

It is highly desirable that the system include an "answer back" feature, that is that the user be quickly informed about the reception of his message. In fact, the user should not leave the area of the receiver until this acknowledgment has been obtained. Several visible and corresponding audible signals are appropriate for the acknowledgment. A visible "OK" signal 147 is energized if there is simultaneous agreement of control bits #1 on line 143, control bits #2 on line 144 and valid changeable bits on line 145. The AND gate 146 reports this condition to the signal generator 147. Disagreements on the personally changeable bits cause the operation of an audible alarm 148 and illumination of a visible red signal 149. Agreement on the emergency signal bits cause an audible alarm 152 and a visible alarm 153 to operate.

A component of the receiver not shown but readily added by one skilled in the art, is an automatic gain control. If several identifiers transmit to the same receiver simultaneously, the automatic gain control will function so that the nearest and strongest signal identifier has its data processed by the receiver first.

A further variation and extension of the identifier allows the identifier to receive data as well as being triggered externally as described previously. This received data may be shown on the display 26 of the identifier in the typical manner of operation for such display devices such as electronic digital watches. Other reporting ability might be included in the identifier, such as biological data or credit requests and changes.

Another variation (not shown) is to mount the identifier on the wrist in a manner like that of an electronic wristwatch. A short antenna may be extended up the forearm to increase the effective radiation range.

The invention claimed:

1. A portable identification system comprising, in combination:
   a housing;
   a primary signal generator in said housing, for generating a primary frequency signal;
   means to generate a plurality of secondary signals from said primary signal;
   first switching means on said housing for transmitting said secondary signals in a predetermined sequence to generate an identification signal; and
   means energizeable to alter the sequence said secondary signals are transmitted thereby to change the characteristics of said identification signal.

2. A portable identification system as defined in claim 1 wherein said secondary signals are of a different frequency than said primary frequency signal.

3. A portable identification system as defined in claim 1 wherein said means energizeable to alter the sequence of said secondary signals is energized by a second switching means on said housing.

4. A portable identification system as defined in claim 3 in which said altered sequence is stored in circuits internal to the identifier.

5. A portable identification system as defined in claim 4 in which said storage circuits are of the type which store the altered sequence even though the main power of the unit is turned off.

6. A portable identification system as defined in claim 3 in which said altered sequence is automatically transmitted upon command by an external radio signal, without need to operate said first switching means.

7. A portable identification system as defined in claim 6 in which said external radio signal is replaced by an audio signal.

8. A portable identification system as defined in claim 1 wherein some of the secondary signals indicate the initiation and cessation of transmission of the identification signal.

9. A portable identification system as defined in claim 1 with means to generate an emergency signal in an emergency situation including a third switching means actuable for initiating said emergency signal.

10. A portable identification system as defined in claim 9 wherein said emergency signal includes a specially modified code to indicate said emergency situation.

11. A portable identification system as defined in claim 9 with means to automatically increase the power level, in response to actuation of said third switching means.

12. A portable identification system as defined in claim 9 with means to automatically change the repetition rate of transmission in response to actuation of said third switching means.

13. A portable identification system as defined in claim 9 with means including an alternate antenna connected to transmit in response to said third switching means.

14. A portable identification system as defined in claim 1 with means to transmit the predetermined sequence by audio sounds to a telephone, including a fourth switching means actuable to energize said transmit means.

15. A portable identification system as defined in claim 1 including display devices connected to report the internal condition and activity of said identifier.

16. An identification system comprising, in combination:
    a portable identifier for generating a primary signal;
    means to generate a plurality of secondary signals from said primary signal;
    first switching means for transmitting said secondary signals in a predetermined sequence to generate an identification signal;
    means energizeable to alter the sequence said secondary signals are transmitted thereby to change the characteristics of said identification signal;
    a receiving station including means to receive said identification signal; and
    means including an internal memory with prerecorded signals to identify said identification signal.

17. A receiving station as defined in claim 16 in which said receiving station includes means to change the prerecorded signals in said internal memory to recognize identification signals altered by energization of said energizeable means to modify the sequence of said secondary signals in said identifier.

18. An identification system as defined in claim 17 in which said receiving station emits a first recognition signal when an identification signal is received and second recognition signal when the identification signal is identified.

19. An identification system as defined in claim 16 wherein said receiving station includes means to signal that said identification signal is identified.

20. An identification system as defined in claim 19 in which said identifier includes a visual display, and means to indicate on the display that said receiving station has identified said identification signal.

21. An identification system as defined in claim 16 wherein said identifier includes means for generating an emergency signal indicating the user needs emergency assistance.

22. An identification system as defined in claim 21 in which said receiving station includes means to recognize said emergency signal and to emit appropriate signals when an emergency signal is identified.

23. An identification system as defined in claim 16 wherein said identifier includes means to generate and transmit audio signals.

24. An identification system as defined in claim 23 in which the receiving station includes means to receive and identify audio signals from said portable identifier.

25. An identification system as defined in claim 16 including means connected to a telephone to receive identification signals from said identifier and transmit said identification signals through telephone lines.

26. An identification system as defined in claim 25 wherein said means connected to the telephone includes means for automatically dialing a preselected number in response to receiving said identification signal.

* * * * *